(12) United States Patent
Piipponen et al.

(10) Patent No.: US 9,426,785 B2
(45) Date of Patent: Aug. 23, 2016

(54) CONTIGUOUS INTRA-BAND CARRIER AGGREGATION (CA), PUCCH, AND QUASI-CONTIGUOUS UPLINK RESOURCE ALLOCATION

(71) Applicant: NOKIA CORPORATION, Espoo (FI)

(72) Inventors: Antti Piipponen, Vantaa (FI); Petri Vasenkari, Turku (FI); Vesa Lehtinen, Tampere (FI); Toni Lähteensuo, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 53 days.

(21) Appl. No.: 14/273,883

(22) Filed: May 9, 2014

(65) Prior Publication Data
US 2014/0341126 A1    Nov. 20, 2014

Related U.S. Application Data

(60) Provisional application No. 61/825,166, filed on May 20, 2013.

(51) Int. Cl.
*H04W 4/00* (2009.01)
*H04W 72/04* (2009.01)
*H04L 5/00* (2006.01)

(52) U.S. Cl.
CPC .............. *H04W 72/04* (2013.01); *H04L 5/001* (2013.01); *H04L 5/003* (2013.01)

(58) Field of Classification Search
None
See application file for complete search history.

(56) References Cited

U.S. PATENT DOCUMENTS

| | | | | |
|---|---|---|---|---|
| 2010/0255868 A1* | 10/2010 | Lee | ...................... | H04W 52/367 455/509 |
| 2012/0002631 A1* | 1/2012 | Nishio | ..................... | H04L 5/001 370/329 |
| 2012/0113909 A1* | 5/2012 | Jen | .................................. | 370/329 |
| 2012/0327866 A1* | 12/2012 | Krishnamurthy | ..... | H04W 52/10 370/329 |
| 2013/0039289 A1* | 2/2013 | Lee et al. | ....................... | 370/329 |
| 2013/0083767 A1* | 4/2013 | Goto | ................... | H04W 52/346 370/329 |
| 2013/0089048 A1* | 4/2013 | Damnjanovic | ......... | H04L 5/001 370/329 |
| 2014/0126440 A1* | 5/2014 | Frank | .................... | H04W 52/06 370/311 |

FOREIGN PATENT DOCUMENTS

| | | |
|---|---|---|
| WO | 2012/097738 A1 | 7/2012 |
| WO | 2013/005904 A1 | 1/2013 |
| WO | 2013/070149 A1 | 5/2013 |

OTHER PUBLICATIONS

R4-110955 (MPR for LTE cluster transmission, Feb. 21-25, 2011).*
3GPP TSG RAN WG4 Meeting #67, R4-132755, "Reducing MPR for CA multi-cluster transmissions", Fukuoka, Japan: May 20-24, 2013 (9 pages).
3GPP TSG-RAN WG4 Meeting #66, R4-130756, St. Julian's, Malta: Jan. 28-Feb. 1, 2013 (4 pages).
3GPP TSG-RAN WG4 Meeting #66, R4-130754, St. Julian's, Malta: Jan. 28-Feb. 1, 2013 (4 pages).

(Continued)

*Primary Examiner* — Kibrom T Hailu
(74) *Attorney, Agent, or Firm* — Squire Patton Boggs (US) LLP

(57) ABSTRACT

A method and apparatus for allocating quasi-contiguous uplink data resources for a user device is provided. Transmission of data comprise at least two data clusters of sub carriers expanding over gaps reserved for uplink control channel in order, for example, to mitigate transmission power reductions due to multi-cluster transmission.

18 Claims, 14 Drawing Sheets

(56) References Cited

OTHER PUBLICATIONS

3GPP TS 36.211 V11.2.0, 3rd Generation Partnership Project; Technical Specification Group Radio Access Network; Evolved Universal Terrestrial Radio Access (E-UTRA); Physical Channels and Modulation (Release 11), Feb. 2013; 109 pages.

3GPP TSG RAN WG4 Meeting #66, R4-130732, St. Julian's Malta, "Reducing MPR for Multi-Cluster Transmissions: 2 CC's", Motorola Mobility, Jan. 29-Feb. 1, 2013, 14 pages.

3GPP TSG RAN WG2 #77, R2-120789, "Where to Porvide the EAB Information", Samsung, Agenda Item 5.1.2, Feb. 6 to 10, 2012, 3 pages.

European Search Report application No. 14167995.1 dated Sep. 4, 2014.

European Communication dated Jul. 14, 2015, issued in corresponding EP Patent Application No. 14 167 995.1-1851.

* cited by examiner

CONTIGUOUS INTRA-BAND CARRIER AGGREGATION (CA), PUCCH, AND QUASI-CONTIGUOUS UPLINK RESOURCE ALLOCATION

CROSS REFERENCE TO RELATED APPLICATIONS

This application claims priority to U.S. Provisional Application No. 61/825,166, filed on May 20, 2013. The entire contents of this earlier filed application are hereby incorporated by reference in its entirety.

BACKGROUND

1. Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments may relate to LTE-A intra-band contiguous carrier aggregation (CA).

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (enhanced Node B).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE are, for example, high throughput, low latency, FDD and TDD support in the same platform, an improved end-user experience, and a simple architecture resulting in low operating costs.

Further releases of 3GPP LTE (e.g., LTE Rel-10, LTE-Rel-11) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A can be considered a more optimized radio system fulfilling the international telecommunication union-radio (ITU-R) requirements for IMT-Advanced while keeping the backward compatibility.

SUMMARY

One embodiment is directed to a method including allocating, by a network node, quasi-contiguous uplink data resources for a user device. Transmission of data by the user device comprises two or more data clusters of sub carriers expanding over gaps reserved for an uplink control channel in order to mitigate transmission power reductions due to multi-cluster transmission.

Another embodiment is directed to an apparatus including at least one processor and at least one memory including computer program code. The at least one memory and the computer program code are configured, with the at least one processor, to cause the apparatus at least to allocate quasi-contiguous uplink data resources for a user device. Transmission of data by the user device comprises two or more data clusters of sub carriers expanding over gaps reserved for an uplink control channel in order to mitigate transmission power reductions due to multi-cluster transmission.

Another embodiment is directed to a computer program embodied on a computer readable medium. The computer program may be configured to control a processor to perform a process including allocating quasi-contiguous uplink data resources for a user device. Transmission of data by the user device comprises two or more data clusters of sub carriers expanding over gaps reserved for an uplink control channel in order to mitigate transmission power reductions due to multi-cluster transmission.

Another embodiment is directed to a method including transmitting, by a user device, data comprising two or more data clusters of sub carriers expanding over gaps reserved for an uplink control channel in order to mitigate transmission power reductions due to multi-cluster transmission. The user device is configured for quasi-contiguous transmission.

Another embodiment is directed to an apparatus including at least one processor and at least one memory including computer program code. The at least one memory and the computer program code are configured, with the at least one processor, to cause the apparatus at least to transmit data comprising two or more data clusters of sub carriers expanding over gaps reserved for an uplink control channel in order to mitigate transmission power reductions due to multi-cluster transmission. The apparatus is configured for quasi-contiguous transmission.

Another embodiment is directed to a computer program embodied on a computer readable medium. The computer program may be configured to control a processor to perform a process including transmitting, by a user device, data comprising two or more data clusters of sub carriers expanding over gaps reserved for an uplink control channel in order to mitigate transmission power reductions due to multi-cluster transmission. The user device is configured for quasi-contiguous transmission.

BRIEF DESCRIPTION OF THE DRAWINGS

For proper understanding of the invention, reference should be made to the accompanying drawings, wherein.

DETAILED DESCRIPTION

Figure 1:
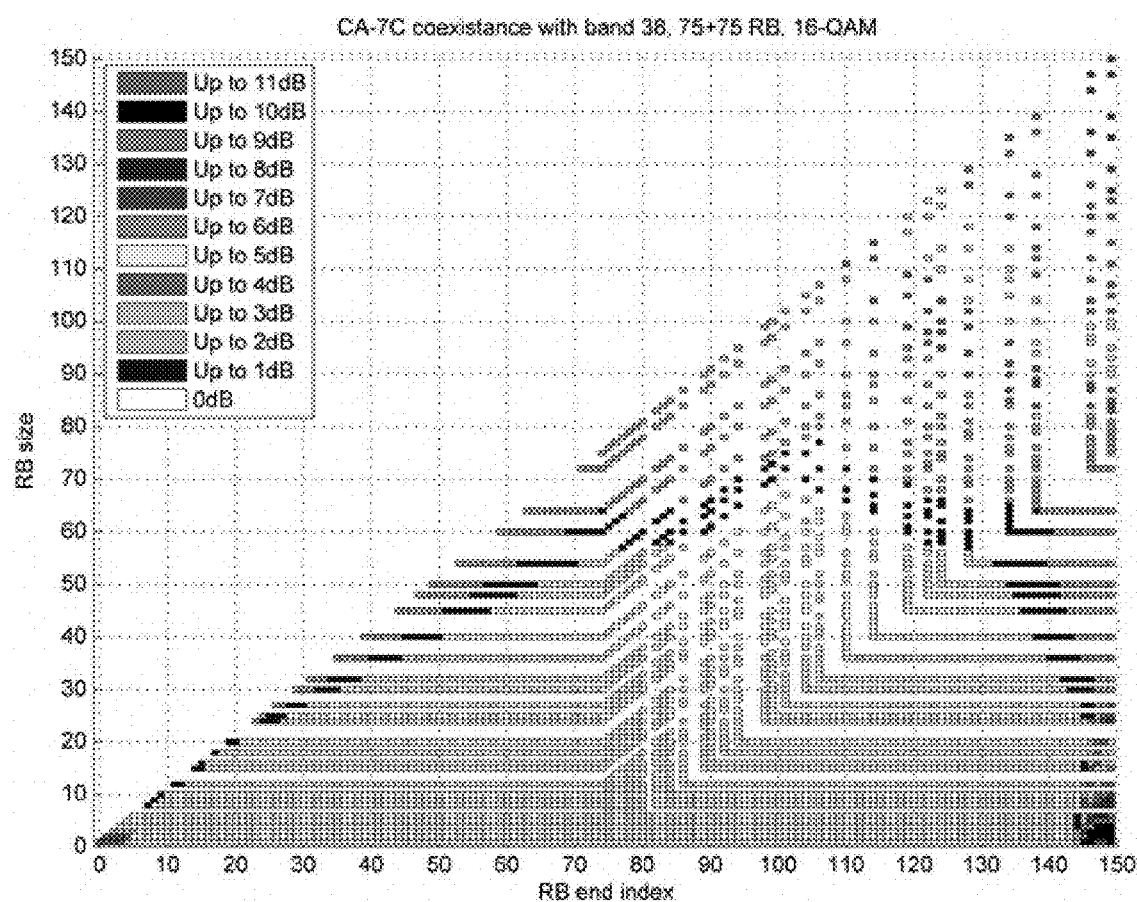
FIG. 1 illustrates an example of simulated MPR requirements for an example CA configuration, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for contiguous intra-band carrier aggregation (CA) as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to LTE-A intra-band contiguous carrier aggregation (CA). Carrier aggregation (CA) refers to the situation where an operator, which has more spectrum than what a single LTE carrier occupies, can use two (or possibly more) LTE carriers to provide a user with more throughput. Data may be transmitted simultaneously on the aggregated carriers. CA can also be used when an operator has fragmented spectrum assets. CA is specified from 3GPP Release 10 onwards, and backwards compatibility is maintained so that 3GPP Release 8 or 9 UEs can still be used in normal single carrier mode on any one of the carriers. Also, any UE supporting CA can be configured for single carrier mode on any of the carriers, or if the conditions permit, CA configuration can be used. The aggregated LTE carriers are called component carriers (CC).

In LTE Releases 8 and 9, uplink resource allocation should be a contiguous block of resource blocks, to preserve the single carrier properties of the signal. From Release 10 onwards, for contiguous CA, contiguous resource allocation can span across the CCs, as long as the allocation on the lower CC includes the highest resource block, and on the upper CC the lowest resource block, i.e., there are no "gaps" in the allocation. Since the CC center frequencies are nominally spaced, the guard band between the CCs is about 5% of the aggregated bandwidth, i.e., for 15+15 MHz CA, the guard band is 1.5 MHz. This guard band between the CCs is not considered as a "gap" in contiguous resource allocation.

One example of CA is intra-band contiguous carrier aggregation. Contiguous CA means that two adjacent LTE carriers are aggregated. The UE reference architecture assumes that the receiver and transmitter chains operate on the aggregated wider bandwidth. Some embodiments focus on this CA scenario.

Another example of CA is intra-band non-contiguous carrier aggregation. If the operator holds two non-adjacent blocks of spectrum on a frequency band, non-contiguous CA can be used. This mode can be used if the carrier spacing of the two carriers is larger than the nominal spacing specified for contiguous CA. Meanwhile, inter-band CA means that the two aggregated LTE carriers are on different frequency bands, for instance 900 and 1800 MHz.

For LTE Release 10, 3GPP RAN 4 has defined uplink requirements for intra-band CA, when the aggregated carriers are adjacent (intra-band contiguous CA). Additionally, requirements have been defined for a contiguous resource allocation (similar to Release 8), and for multi-cluster transmission. Any resource allocation with at least two clusters may be considered multi-cluster, except if the allocation is contiguous, i.e., the one cluster on the lower CC includes the highest resource block, and the one cluster on the upper CC includes the lowest resource block. Exactly one cluster on one CC is by definition contiguous allocation. In LTE Release 11, multi-cluster transmission for single carrier was also defined.

Physical Uplink Control Channel (PUCCH) is used to transmit control information, such as scheduling requests, hybrid automatic repeat request (HARQ) Ack/Nack feedback, and channel quality indication. The transmission occupies two resource blocks, where there is a frequency hop in the middle of the subframe. Usually, the PUCCH resource blocks are configured at the outer edges of the LTE carrier. One reason for this is to maximize the contiguous physical uplink shared channel (PUSCH) allocation size in Release 8 or 9-if the PUCCH resources were configured inwards from the edges, the region in between would be smaller, thereby reducing the maximum PUSCH resource allocation size and peak uplink data rate.

Typically, in single carrier operation, PUCCH is placed at the edges of the channel, and the PUSCH locates between them. It should also be noted that all PUCCH transmissions have a frequency hop at the slot edge (middle of the subframe), so that the complete transmission occupies resource blocks at both channel edges. This is the most efficient arrangement for Releases 8 and 9, since only contiguous PUSCH clusters may be transmitted. PUCCH overprovisioning (i.e. moving the PUCCH resources symmetrically inwards from the channel edges) is also possible, but this restricts the maximum PUSCH allocation into the resource blocks between the PUCCH positions and thus limits the maximum throughput. PUCCH configuration is signaled in system information block 2 (SIB2) and hence is relatively fixed within a cell. Also, the same PUCCH configuration can apply for all UEs in the cell.

In some coexistence scenarios, the narrowband (1 resource block) PUCCH transmissions would create too strong interference peaks on adjacent frequencies. PUCCH overprovisioning means that the PUCCH regions are brought symmetrically inwards from the channel edges, which in turn also reduces the frequency span over which the interference peaks reach. This approach creates a fragmented PUSCH space: one contiguous region between the PUCCH, one contiguous region below the lower PUCCH, and one contiguous region above the higher PUCCH. This limits the size of the contiguous PUSCH allocation, and to get more throughput, multi-cluster allocation may be used.

Multi-cluster transmission is inherently more difficult than single cluster, because the resulting waveform no longer has true single carrier properties, and behaves like a composite of two (or more) independent transmissions, increasing the peak-to-average power ratio. Significant Maximum Power Reduction (MPR) is allowed for such transmissions compared to single cluster.

To keep the UE transmitter requirements to a reasonable level, in some transmission scenarios, a reduction in the maximum output power is allowed. Contiguous resource allocation on a single carrier maintains the single carrier properties of the signal, and can be considered as the baseline. If the resource allocation is sufficiently large, a small relaxation on the maximum output power is allowed, to allow suppression of the spectral regrowth in the transmitter. Multi-cluster transmission no longer preserves the single carrier properties, and, for example, increases the peak-to-average ratio of the signal, meaning that if the UE performance requirement is not tightened, more relaxation to the transmit power must be allowed. MPR use is voluntary for a UE, but typical implementations use as much as is allowed, and the network must assume this. Therefore, it is important to limit the excess MPR to minimum, in order to maintain good spectral efficiency. With too much excess MPR for a specific feature, the geographical area where the feature is useful becomes reduced.

One of the problems related to specifying MPR for multi-cluster transmission is that the possible resource allocations are almost limitless, making efficient MPR rules difficult. If in single carrier operation PUCCH overprovisioning is used, Release 11 and later UEs can still utilize the full PUSCH capacity with a multi-cluster transmission, but with reduced maximum power. Therefore, it is still beneficial to use regular PUCCH positions at the channel edges.

Similar to single cluster transmission, the intra-band CA defines requirements for a "contiguous" resource allocation that can span across the carriers (TS 36.101, Rel-10, section 6.2.3A). The contiguous allocation means that the PUSCH will go across PUCCH regions of both carriers, making it impossible for any UE to transmit on PUCCH in the same subframe with the CA UE transmitting the contiguous PUSCH allocation. Only PUSCH may be transmitted in the same subframe, using the available resource blocks left unused by the CA UE. To overcome this problem, multi-cluster allocation could be used for the CA UE, to skip the PUCCH regions, but this increases MPR (for contiguous allocation, the MPR is in the range of 1-3 dB; for multi-cluster it is 3-8.5 dB).

Also, protection of other services close or adjacent to the used LTE band may become a problem with wide CA configurations. Even if 20 MHz bandwidth may be supported without problems in single carrier operation, the CA configurations may need additional restrictions. Wider transmission bandwidth produces unwanted emissions further away from the center frequency.

FIG. 1 illustrates an example of simulated MPR requirements for an example CA configuration, when contiguous resource allocation is used, as a function of allocation size and position. The example is 15+15 MHz CA on LTE band 7, which has to protect band 38 locating in the duplex gap. On the y-axis, FIG. 1 shows the contiguous allocation size (in RBs), and, on the x-axis, FIG. 1 shows the end position of the allocation (RB index, i.e. start index+size−1).

It can be seen from the example of FIG. 1 that, on the lower component carrier (RB end indexes 0-74), MPR is needed for transmission sizes at the lowermost positions (about indexes 0-5). Transmissions in the upper component carrier (RB end indexes 75-149), on the other hand, need MPR at the uppermost positions for all transmission sizes (about indexes 144-149). These restrictions mean that a UE configured for CA cannot transmit PUCCH with full power, unless the PUCCH resources are overprovisioned inwards. For CA configured UEs in the example scenario, PUCCH transmissions in the component carriers' normal positions (0 and 74, or 75 and 149) would require high MPR. This is because the PUCCH transmission would occupy, for example, indexes 0 and 74, with a frequency hop in the middle of the subframe, and the MPR allowance for the transmission would be according to the larger of the two values. PUCCH overprovisioning may need to be used and, thus, also single carrier UEs will suffer from the CA configuration, because the maximum contiguous PUSCH size is reduced.

Embodiments provide several embodiments, each partially solving problems related to contiguous CA configuration, and using single carrier and CA UEs in the same cells.

A first embodiment relates to overcoming MPR when transmitting PUCCH. In this embodiment, the LTE eNB with contiguous CA capability, configures PUCCH overprovisioning for at least one carrier when it configures CA for at least one connected UE; if there are no connected UEs with CA configuration, PUCCH overprovisioning is not necessarily used. All CA UEs have a primary cell (PCell) on the carrier with PUCCH overprovisioning, enabling them to transmit PUCCH without MPR.

A second embodiment relates to overcoming contiguous PUSCH that "overrides" PUCCH for all UEs in the cell. When transmitting PUSCH, this embodiment allows "quasi-contiguous" resource allocation that skips PUCCH regions, while still being classified as "contiguous". This could apply to non-CA UEs in a cell, which has PUCCH overprovisioning configuration due to CA UEs, as well as CA UEs transmitting PUSCH spanning across component carriers. For contiguous CA, there is already a "gap" between the component carriers, effectively making the transmission dual-clustered. The MPR for such "quasi-contiguous" allocation can be kept significantly lower than for arbitrary dual-cluster (or multi-cluster) transmission, because the amount of resource allocations is limited and may be exhaustively simulated.

A third embodiment relates to a time-domain solution. In this embodiment, the eNB creates a synchronized PUCCH schedule for both component carriers, when there are connected CA UEs. For example, half of the subframes could have no PUCCH on either of the component carriers, enabling CA UEs to transmit over the complete channel bandwidth. Uplink control information may be transmitted over PUSCH in these subframes (i.e., Physical Downlink Shared Channel (PDSCH) allocations in subframe n−4 would correspondingly have some PUSCH allocation in subframe n in LTE system operating in frequency domain duplexing mode); fixed PUCCH resources, like semi-persistent scheduling (SPS) Ack/Nack, periodic channel quality indicator (CQI) and scheduling request (SR) may be allocated in the subframes with PUCCH.

It should be noted that the embodiments described herein are not necessarily mutually exclusive. As such, it may be possible to combine two or more embodiments according to certain configurations.

In one example, the implementation of the first and third embodiments is within the eNB. The first embodiment may involve the configuration of PUCCH overprovisioning (described below) whenever any UE in the cell is configured to use the contiguous CA. According to one example, the third embodiment may involve the eNB scheduler tracking resource usage for all UEs in more detail. For example, all SR resources, SPS Ack/Nack feedback, and periodic CQI reporting is allocated into the same subframes, while leaving some of the subframes completely unallocated. In these subframes (allocated for CA PUSCH transmissions), the PUCCH resource blocks are still configured, but no UE has any PUCCH resource allocation. This can be partly performed, for example, by scheduling PUSCH data blocks into these subframes, which means that if simultaneous PUCCH+PUSCH is not used, uplink control information is multiplexed into the PUSCH transmission.

According to the second embodiment, a dual-/multi-cluster PUSCH transmission is used to skip the PUCCH regions while still conforming to contiguous allocation MPR. In multi-cluster PUSCH transmission, the uplink resource allocation includes at least two separate clusters of resource blocks. Relatively high MPR is allowed, since the amount of possible resource allocations is almost limitless and difficult to simulate. In dual-cluster PUSCH transmission, the uplink resource allocation includes exactly two separate clusters of resource blocks. Relatively high MPR is allowed, since the amount of possible resource allocations is almost limitless and difficult to simulate.

Using a dual-/multi-cluster PUSCH transmission to skip the PUCCH regions, while still conforming to contiguous allocation MPR, may be referred to as quasi-contiguous transmission. This approach greatly reduces excess MPR and makes contiguous CA much more attractive.

This second embodiment may necessitate a modification to 3GPP TS 36.101. While the PUCCH configuration can be mostly read by the UE from the broadcast system information, another approach is to state in the specification for each channel bandwidth and CA bandwidth combination, how large a gap (in resource blocks) is allowed for a quasi-contiguous transmission, for it to still conform to the contiguous transmission MPR scheme. For example, in 20+20 MHz contiguous CA scenario, the guard band between the CCs is 1.8 MHz, meaning 10 RB gap, so extending this to include the PUCCH regions at the CC edges to, e.g., 14 or 16 RBs should be feasible.

Another possibility is for a UE to calculate the resource block indexes of PUCCH from the broadcast information. Then, the UE uses this information together with the PUSCH resource allocation, to determine whether criteria for quasi-contiguous allocation is met (i.e., PUCCH indeed is in the gap). Yet another possibility is that the eNB explicitly signals how large a gap there may be in the multi-cluster allocation, instead of defining static gap sizes in the specification. Yet another possibility is that the eNB explicitly signals in the original multi-cluster resource allocation grant, whether quasi-contiguous MPR is used. Additionally, instead of having the gaps only at PUCCH positions, the gaps (of specified maximum size) may also be located elsewhere within the channel.

The PUCCH configuration is broadcast in SIB2, which all UEs read during connection setup, prior to transmitting anything in uplink. In SIB2, the following parameters are used to determine where PUCCH is located:

$N_{RB}^{(2)}$, the amount of RBs reserved for periodic CQI reports (PUCCH format 2/2a/2b);

$N_{CS}^{(1)}$, the amount of cyclic shifts reserved for PUCCH formats 1/1a/1b in the RB for mixed formats 2 and 1;

$N_{PUCCH}^{(1)}$, the amount of persistently scheduled PUCCH format 1a/1b resources;

$\Delta_{shift}^{PUCCH}$, the cyclic shifts separating adjacent format 1/1a/1b resources.

Figure 2:
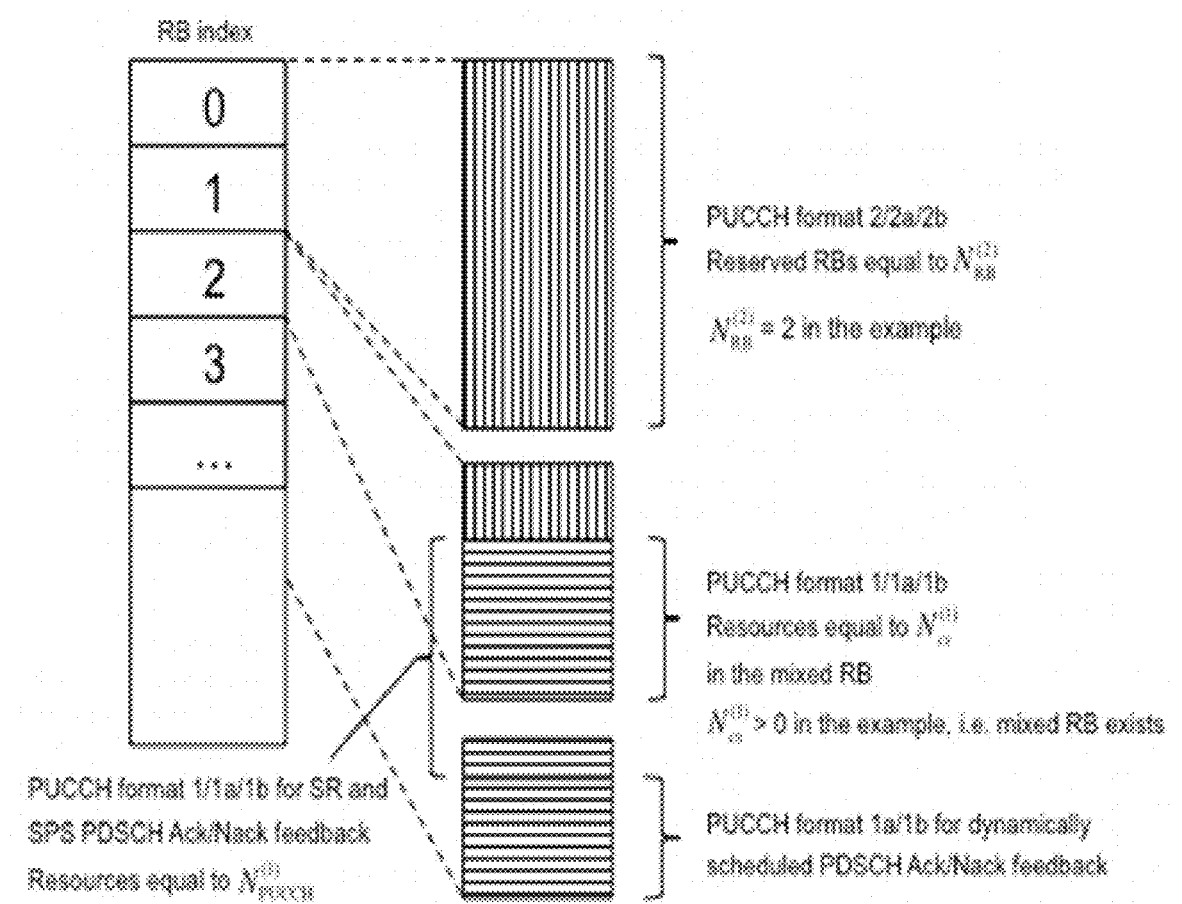
FIG. 2 illustrates an example PUCCH configuration, according to an embodiment.

FIG. 2 illustrates an example PUCCH configuration, according to an embodiment. The PUCCH configuration can be explained as follows. The outermost $N_{RB}^{(2)}$ physical resource blocks (i.e., from index 0 to $N_{RB}^{(2)}-1$) of the carrier are allocated for periodic CQI reports, i.e., PUCCH format 2/2a/2b. Inside these resource blocks, there may be exactly one resource block, which is shared between PUCCH formats 2 and 1—this is the case if the parameter $N_{CS}^{(1)}$ is non-zero. These two parameters determine which resources the PUCCH format 1/1a/1b transmissions should use.

The PUCCH format 1/1a/1b resources are arranged such that the outermost resources are allocated to semi-persistently scheduled PDSCH Ack/Nack feedback and for SR. Inside these (starting resource as determined by the parameter $N_{PUCCH}^{(1)}$) are the Ack/Nack resources for dynamically scheduled PDSCH blocks.

It should be noted, that the parameters $N_{CS}^{(1)}$ and $N_{PUCCH}^{(1)}$ denote PUCCH resources instead of physical resource blocks. The parameter $\Delta_{shift}^{PUCCH}$ tells how many cyclic shifts separate adjacent PUCCH resources, and can be used to determine how many physical resource blocks the PUCCH configuration requires, as long as the amount of resources is known. The only unknown remaining is the amount of PUCCH format 1a/1b resources for dynamically scheduled PDSCH Ack/Nack feedback, which is the same as the number of Control Channel Elements in PDCCH.

Another possibility is that the PUCCH region indexes are explicitly signaled in some new broadcast parameter, and the UE automatically compares its PUSCH multi-cluster allocation to the PUCCH regions, to determine whether quasi-contiguous criteria is met.

The PUSCH signal generation with "gaps" on PUCCH positions could be the same as for normal Release 10 multi-cluster. Existing RAN 1 specifications for physical resource allocation could be used, or alternatively it could be specified in the standard that PUCCH indexes are "punctured" from the PUSCH allocation in some conditions.

The simulation results depicted below in Tables 1 and 2 illustrate how much the excess back-off may be reduced with the second embodiment. The simulation assumptions are the same as the RAN 4 UE minimum requirements and should be well in line with the 3GPP specifications.

First, the contiguous CA MPR is compared to simulations. The MPR allowance in TS 36.101 sections 6.2.3 and 6.2.3A is shown in the following tables. Table 1 is for Release 8 and 9 type single carrier single cluster transmission, and Table 2 is from Release 10 onwards for contiguous CA with contiguous resource allocation.

TABLE 1

Maximum Power Reduction (MPR) for Power Class 3

| | Channel bandwidth/ Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

TABLE 2

Maximum Power Reduction (MPR) for Power Class 3

| | CA bandwidth Class C | | | | |
|---|---|---|---|---|---|
| Modulation | 50 RB + 100 RB | 75 RB + 75 RB | 75 RB/ 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

The MPR formula for multi-cluster transmission (based on allocation ratio) is a follows:

$$MPR = \text{ceil}\{M_A, 0.5\}$$

$$M_A = 8.2; \quad 0 \leq A < 0.025$$

$$9.2 - 40A; \quad 0.025 \leq A < 0.05$$

$$8 - 16A; \quad 0.05 \leq A < 0.25$$

$$4.83 - 3.33A; \quad 0.25 \leq A \leq 0.4,$$

$$3.83 - 0.83A; \quad 0.4 \leq A \leq 1,$$

where $A = N_{RB\_alloc} / N_{RB\_agg}$.

FIGS. 3-6 discussed below present the allowed MPR (according to the above-discussed TS 36.101 specification), and the simulated MPR requirement. In FIGS. 3-6, the contiguous/quasi-contiguous allocation size is shown on the y-axis (in RBs), and the allocation end index is shown on the x-axis. All examples are for 75+75 RB general case, using QPSK modulation. All legal resource allocations have been simulated.

Figure 3A:
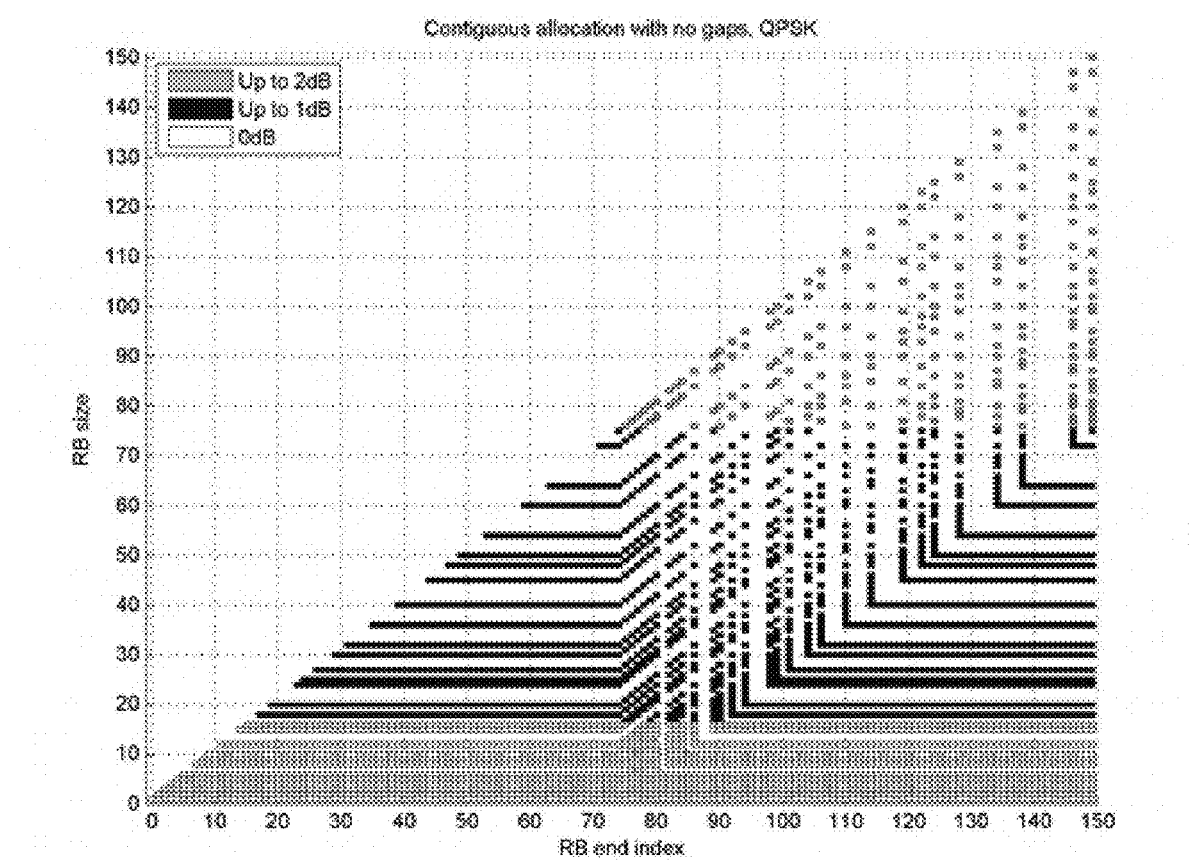
FIG. 3a illustrates the allowed MPR for contiguous allocation.
Figure 3B:
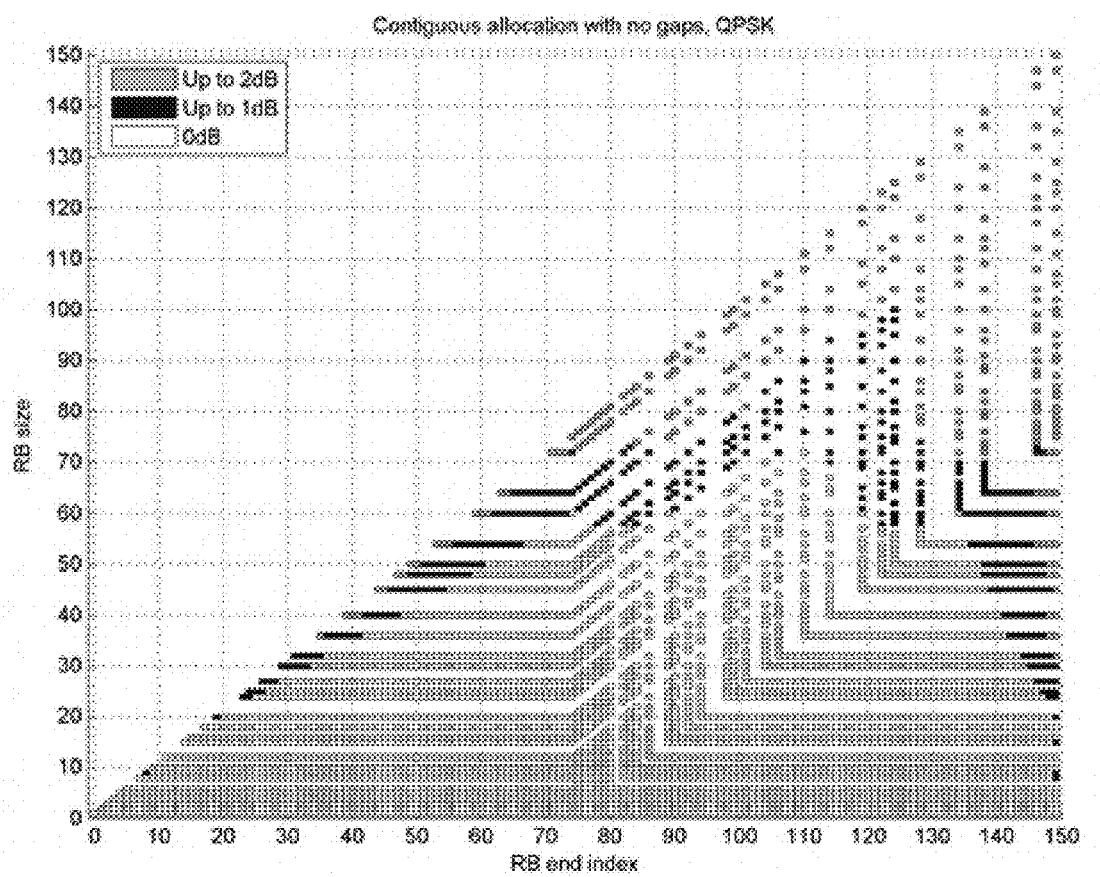
FIG. 3b illustrates the required MPR for contiguous allocation, according to an embodiment.

FIG. 3a illustrates the allowed MPR for contiguous allocation, and FIG. 3b illustrates the required MPR for contiguous allocation. The maximum MPR (2 dB) is well in line with the specification, but some allocations of size 32-75 would require more than the allowed 1 dB when the allocation is at the outer edge of the composite carrier. For 75+75 RB CA, the gap between the component carriers is 1.5 MHz, which is about 8.3 RBs. The transmission is in reality not contiguous, and also the signal generation is done separately for each component carrier, meaning that single carrier properties do not apply for the composite transmit signal. As stated above, PUCCH regions are typically placed at the outer edges of the carriers. In one example, for a 15 MHz carrier, some 1-4 RBs could be used for PUCCH, or possibly more.

Figure 4A:
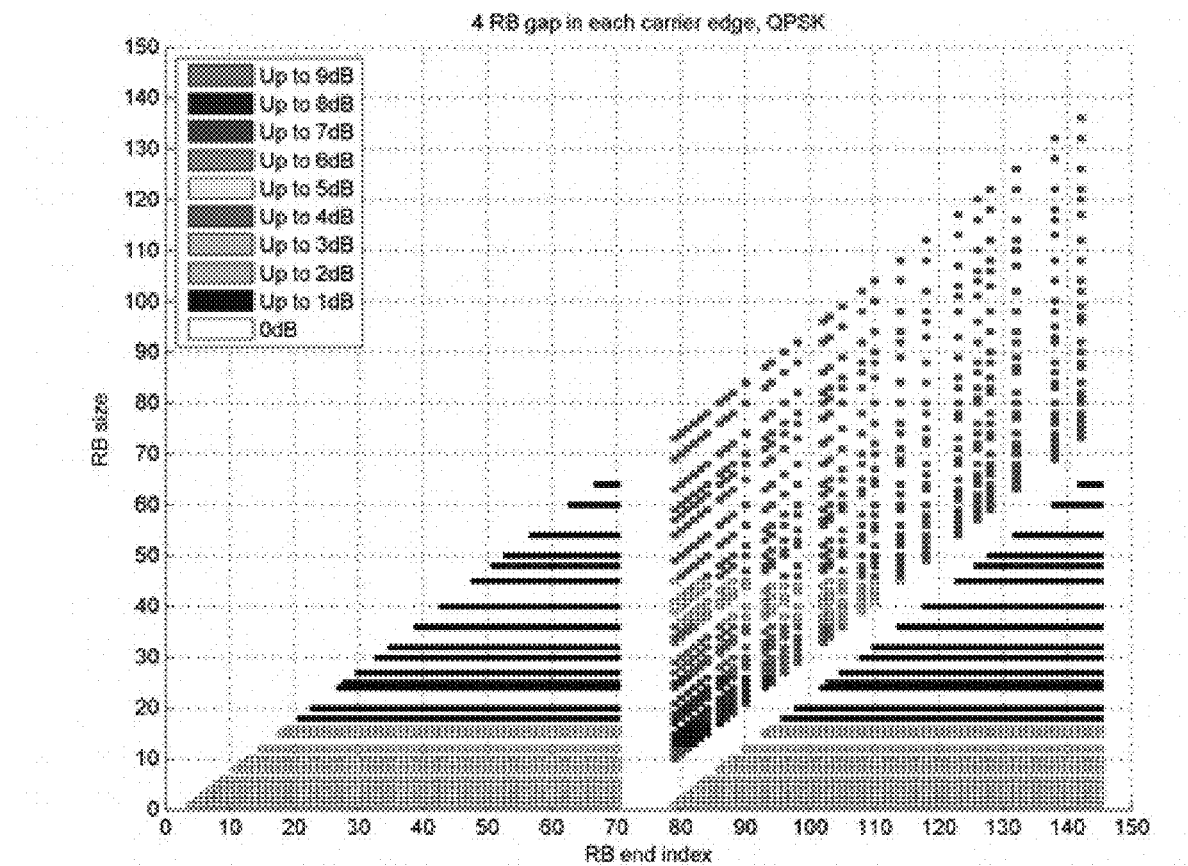
FIG. 4a illustrates the allowed MPR for quasi-contiguous allocation with 4 RB gaps at the edges of both component carriers.
Figure 4B:
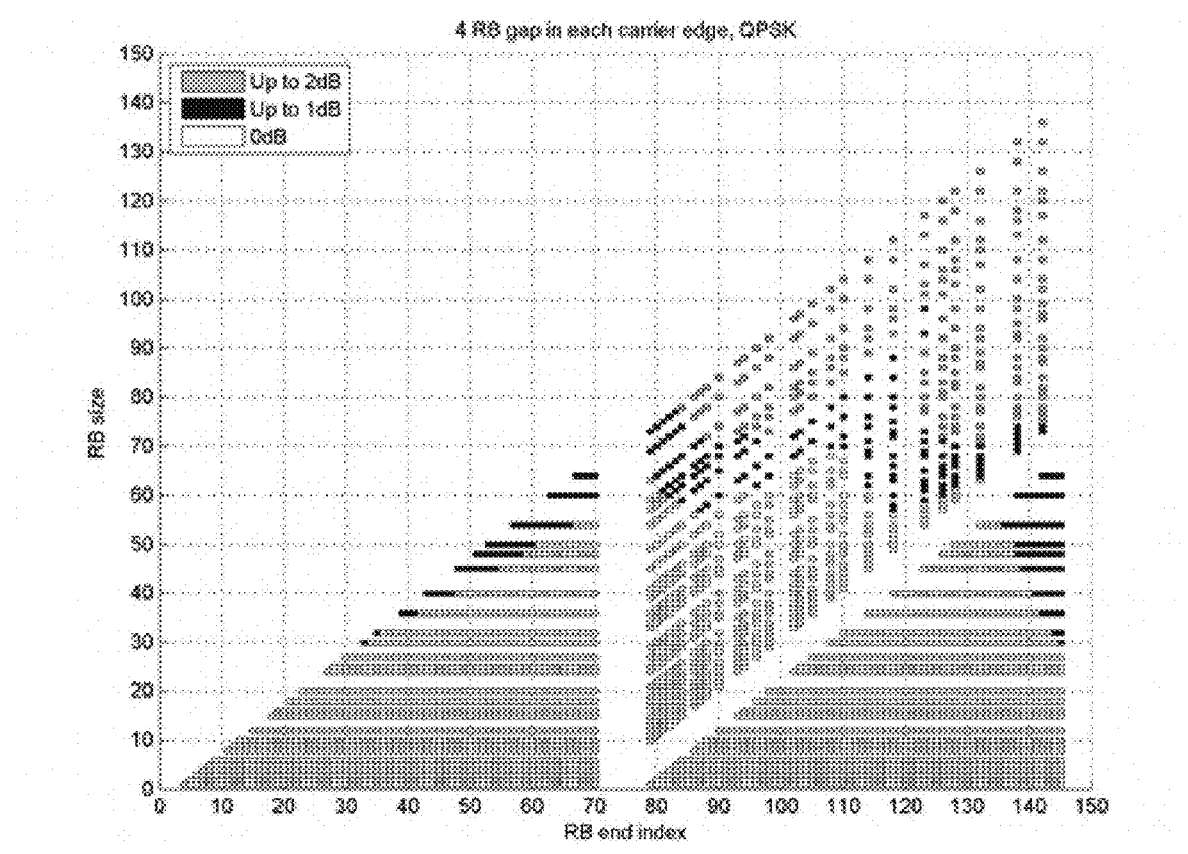
FIG. 4b illustrates the required MPR for quasi-contiguous allocation with 4 RB gaps at the edges of both component carriers, according to an embodiment.

FIG. 4 illustrates a dual-cluster PUSCH transmission, which leaves the outer 4 RBs unused on both component carriers. FIG. 4a illustrates the allowed MPR for quasi-contiguous allocation with 4 RB gaps at the edges of both component carriers, and FIG. 4b illustrates the required MPR for quasi-contiguous allocation with 4 RB gaps at the edges of both component carriers. The simulation of FIG. 4 demonstrates that, for a gap of this size, the dual-cluster quasi-contiguous transmission MPR follows very well the contiguous MPR allowance (shown in FIG. 3). There is only a slight increase at 72-75 RB size. The "parallelogram" in the triangle-shaped allocation space shows the allocations that go across the carrier. The extremely high MPR allowance for these allocations is due to multi-cluster specification, and this simulation well demonstrates how the excess MPR can be reduced by using the second embodiment.

Figure 5A:
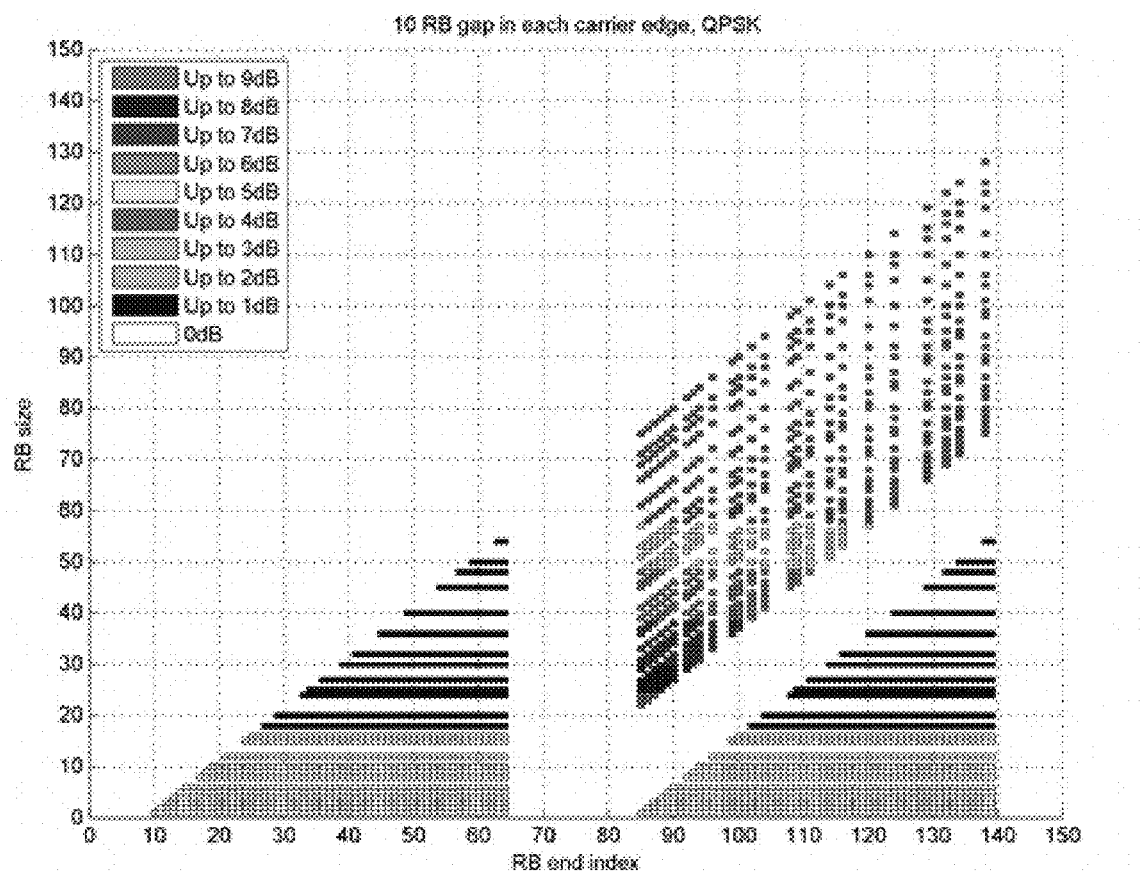
FIG. 5a illustrates the allowed MPR for quasi-contiguous allocation with 10 RB gaps at the edges of both component carriers.
Figure 5B:
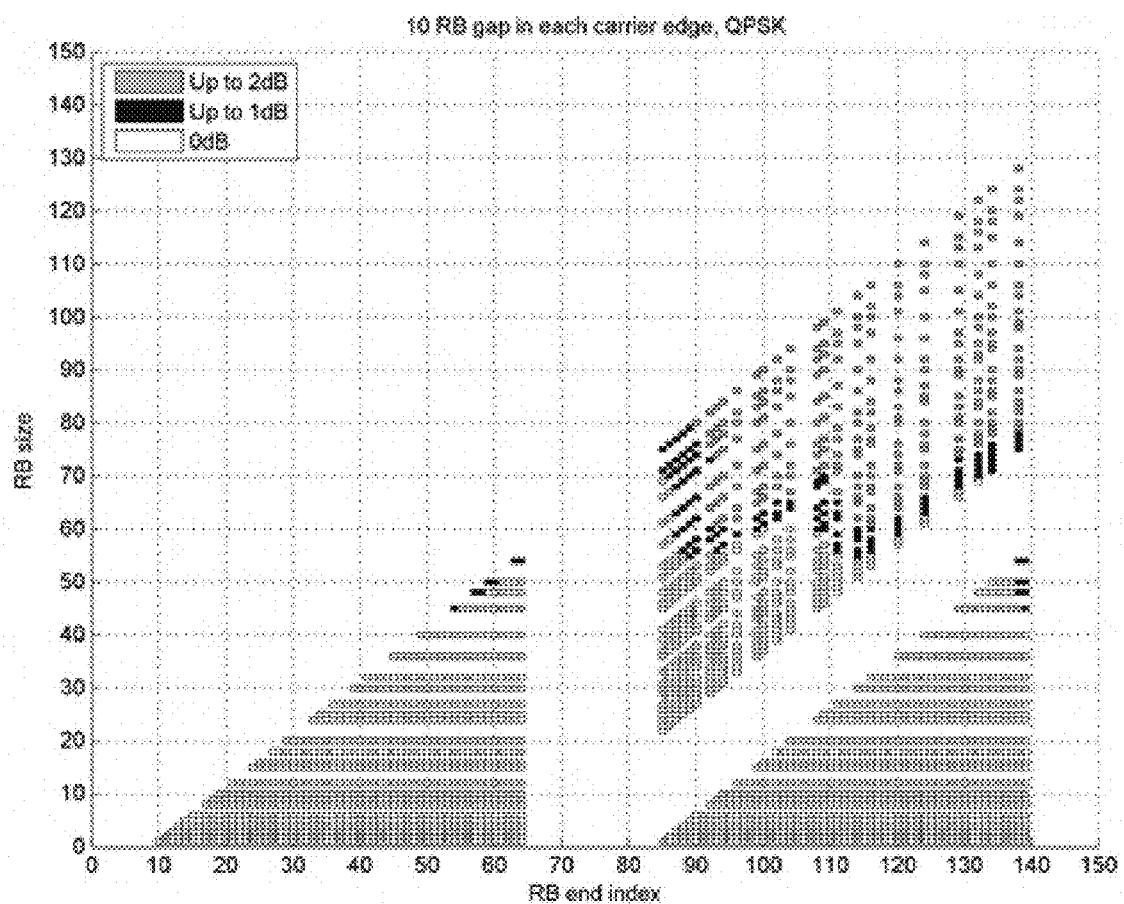
FIG. 5b illustrates the required MPR for quasi-contiguous allocation with 10 RB gaps at the edges of both component carriers, according to an embodiment.

FIG. 5a illustrates the allowed MPR for quasi-contiguous allocation with 10 RB gaps at the edges of both component carriers, and FIG. 5b illustrates the required MPR for quasi-contiguous allocation with 10 RB gaps at the edges of both component carriers. The required MPR increases slightly when the gap size increases, however when compared to the multi-cluster MPR allowance, a large reduction in excess MPR can be easily achieved.

Figure 6A:
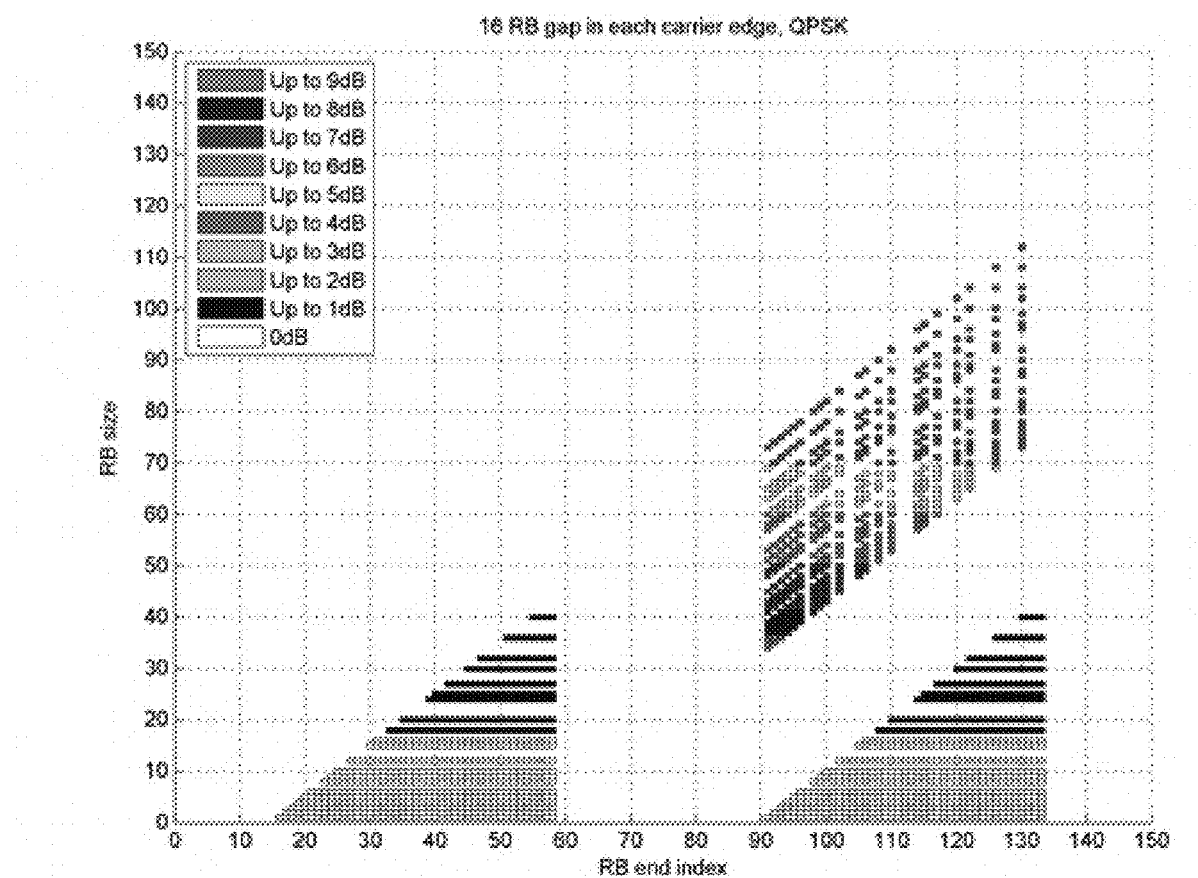
FIG. 6a illustrates the allowed MPR for quasi-contiguous allocation with 16 RB gaps at the edges of both component carriers.
Figure 6B:
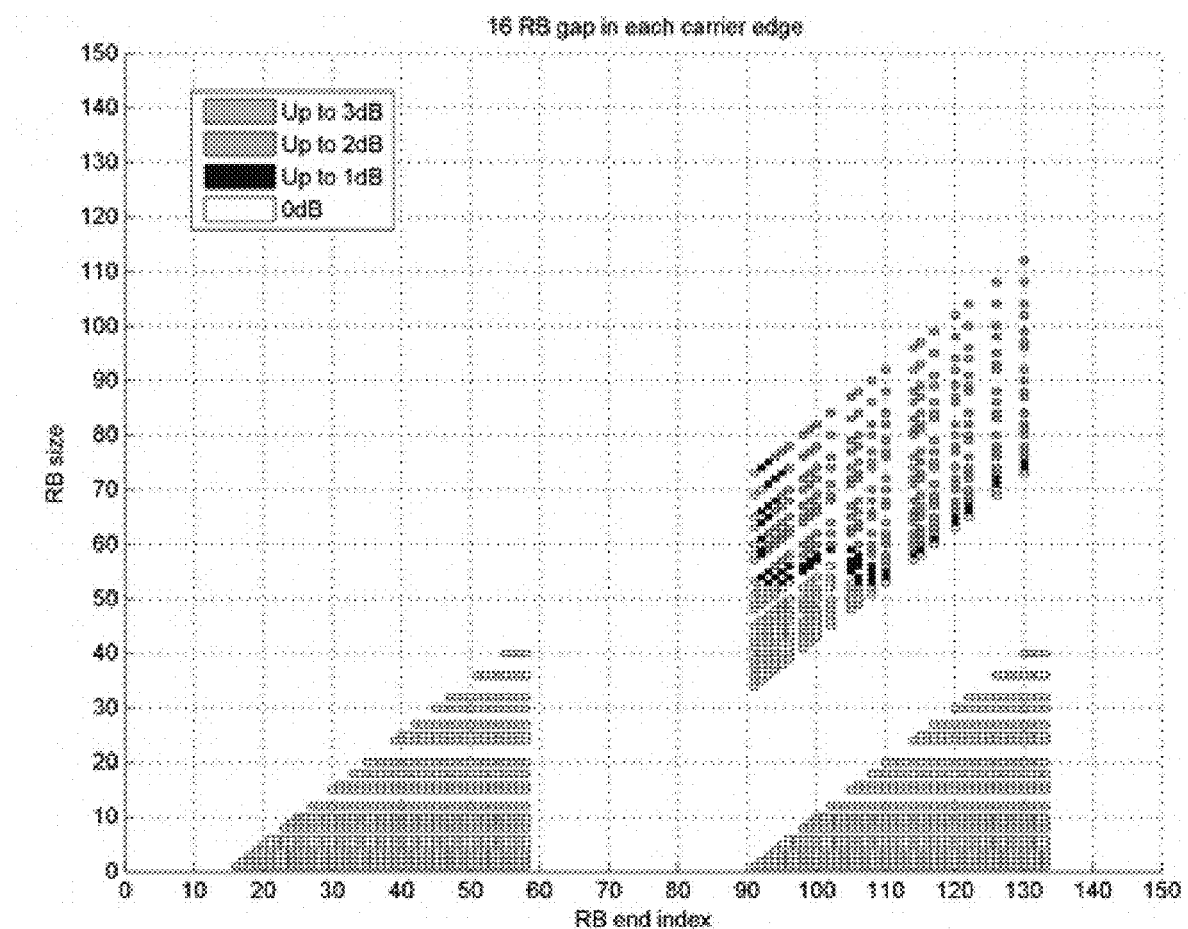
FIG. 6b illustrates the required MPR for quasi-contiguous allocation with 16 RB gaps at the edges of both component carriers, according to an embodiment.

FIG. 6a illustrates the allowed MPR for quasi-contiguous allocation with 16 RB gaps at the edges of both component carriers, and FIG. 6b illustrates the required MPR for quasi-contiguous allocation with 16 RB gaps at the edges of both component carriers. FIG. 6b illustrates that for quasi-contiguous allocation with even an extremely large gap, the required MPR is almost the same as for contiguous. Practical LTE deployments would probably use approximately 4 RBs or less for PUCCH, in which case the quasi-contiguous allocation is almost contiguous as specified currently. The results also scale to 100+100 RB CA and for narrower CA combinations, as long as the ratio of PUCCH size to carrier bandwidth remains roughly the same.

The simulations illustrated in FIGS. 3-6 are for a general case, where there are not any additional spectral emission masks. Practical cases, such as Bands 7/38 and Band 1 in Japan, have also been considered. Bands 7 and 38 have to protect each other, meaning that emissions across bands are stricter than in the general mask. For single carrier operation, some restrictions in the widest resource allocations are necessary and have been specified in TS 36.101. The MPR simulation results shown in FIG. 1 indicate that, if a UE is configured for contiguous CA on Band 7, it may need MPR for narrow resource allocations on the edges of both carriers. This prevents transmitting PUCCH at the maximum power, reducing significantly the area where CA can be configured. The first embodiment may be needed to enable CA usage in such a situation, i.e., where PUCCH is overprovisioned on one of the carriers.

The use of the first embodiment can have two primary effects. First, single carrier UEs are also affected on one carrier, because the maximum contiguous PUSCH size is reduced due to PUCCH overprovisioning Second, the quasi-contiguous allocation (second embodiment) is even more favorable, because multi-cluster MPR with additional emission mask typically allows huge backoff, and because of PUCCH overprovisioning, most large resource allocation(s) become multi-clustered. Multi-cluster MPR formulas do not take into account the resource allocation positions, and therefore assume worst case.

Figure 7:
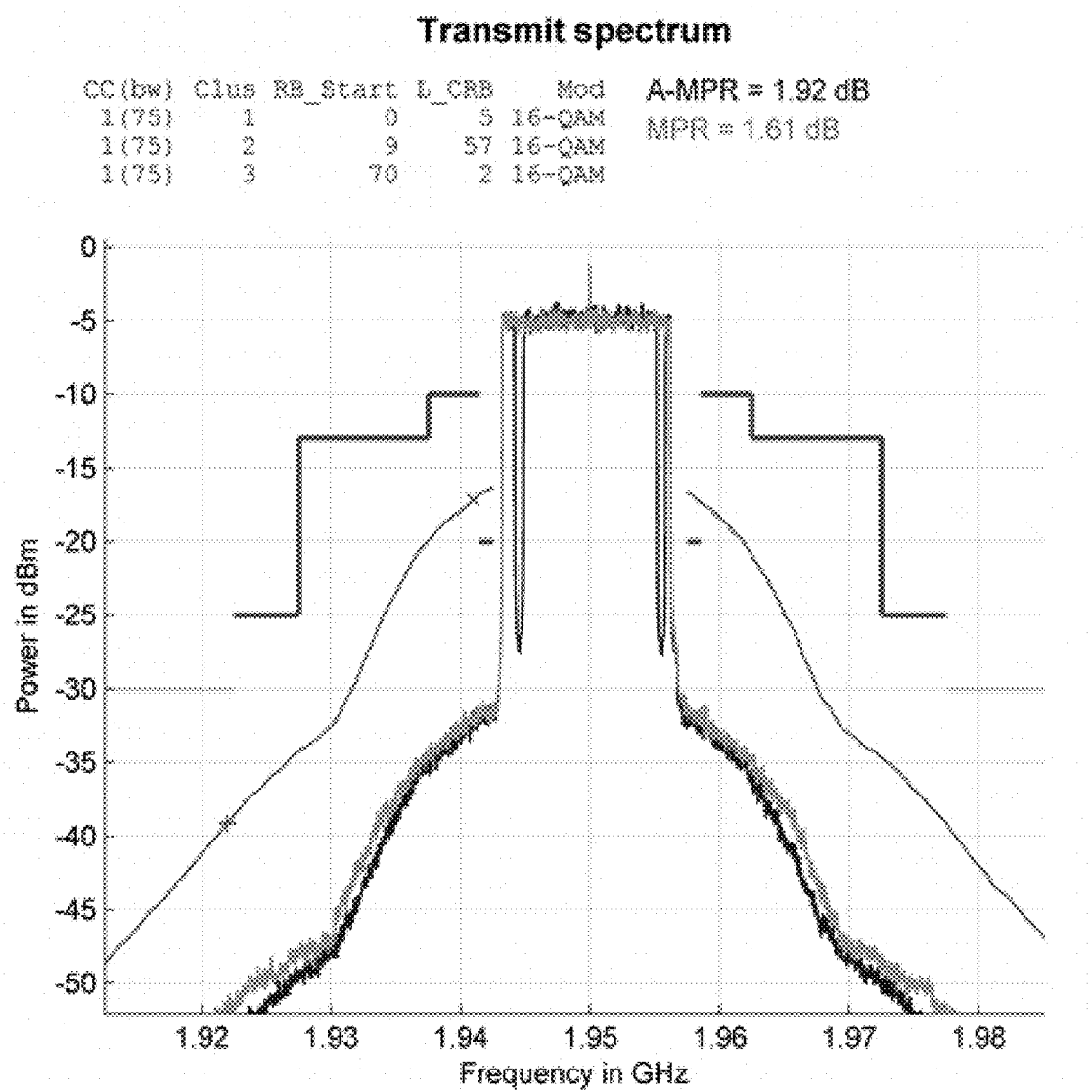
FIG. 7 illustrates how the quasi-contiguous emission spectrum and required MPR differ from contiguous allocation, when PUCCH overprovisioning is used, according to one embodiment.

FIG. 7 illustrates how little the quasi-contiguous emission spectrum and required MPR differ from contiguous allocation, when PUCCH overprovisioning is used (according to the first embodiment) and the PUCCH size is 4 RB. It can be concluded that quasi-contiguous allocation could also be used on a single carrier, instead of forcing the use of multi-cluster transmission. As illustrated in FIG. 7, single carrier 75 RB contiguous allocation (green curve) requires 1.61 dB of MPR for 16-QAM modulation; while the same quasi-contiguous allocation (blue curve) with two 4 RB gaps at the overprovisioned PUCCH positions requires 1.92 dB MPR.

Figure 8:
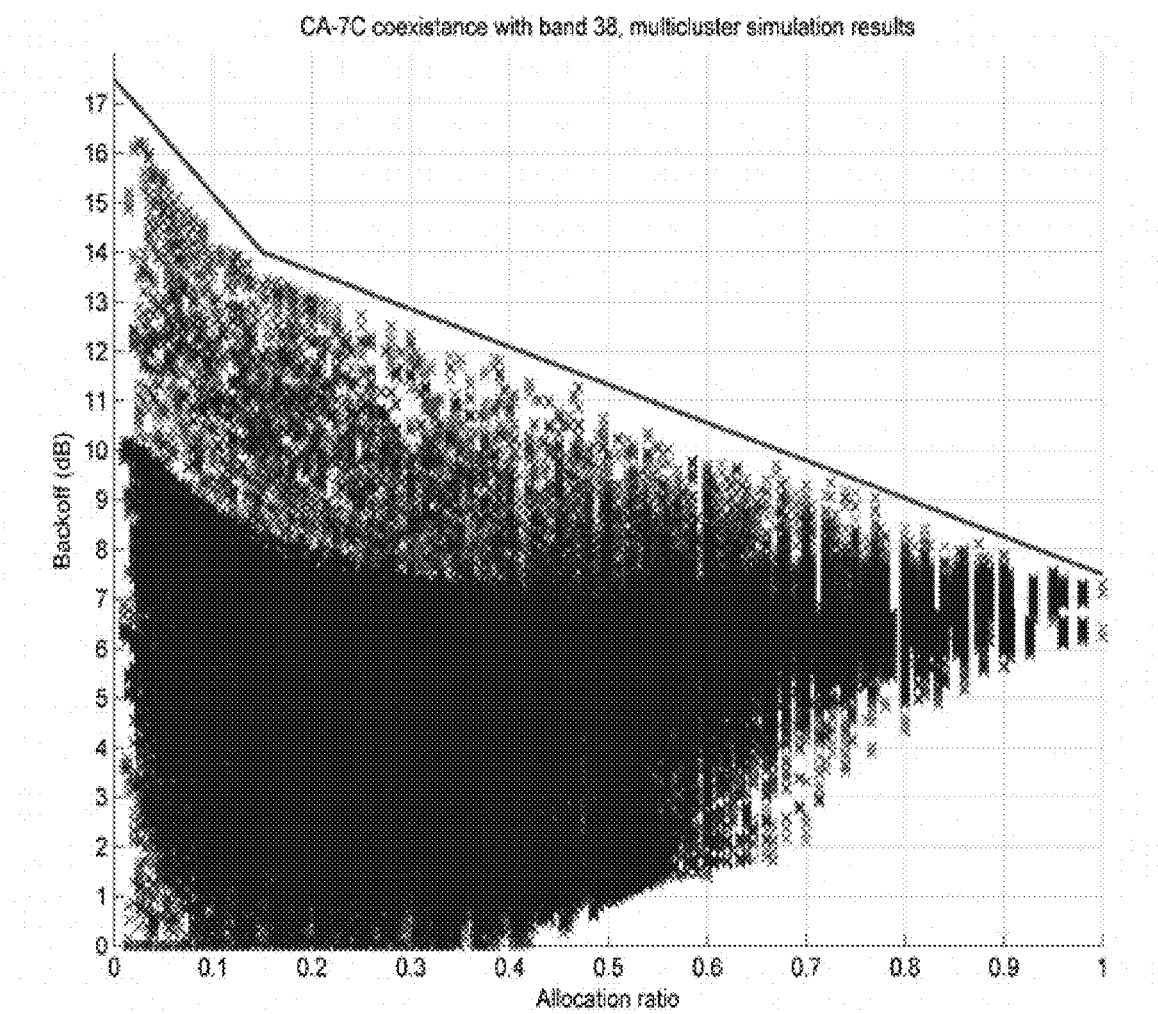
FIG. 8 illustrates a simulated MPR for multi-cluster transmission on Band 7 CA, according to an embodiment.

FIG. 8 illustrates a simulated MPR for multi-cluster transmission on Band 7 CA, according to the second embodiment. As illustrated in FIG. 8, the MPR (mask shown by the red curve) is extremely high because of the additional emission mask to protect Band 38.

Figure 9:
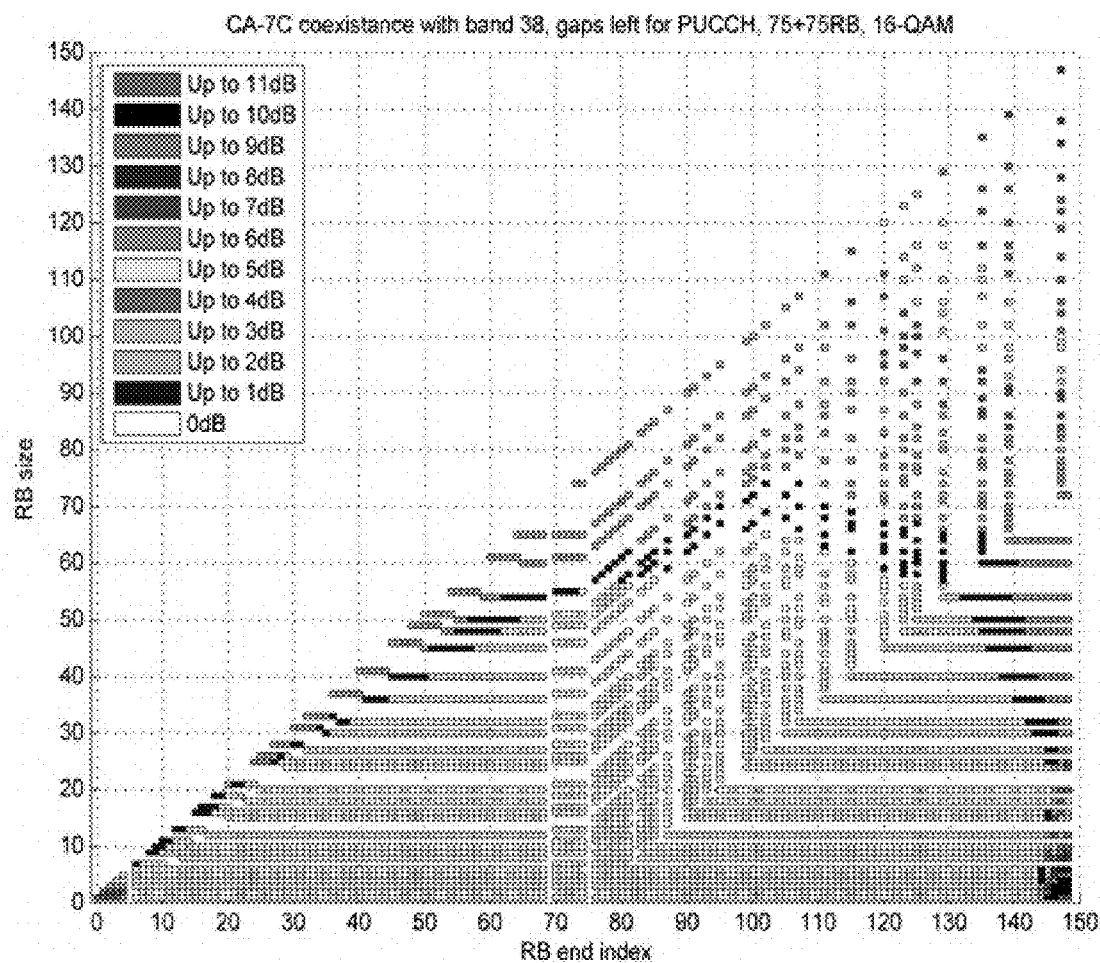
FIG. 9 illustrates a simulated MPR for quasi-contiguous allocation for CA on Band 7, according to an embodiment.

FIG. 9 illustrates a simulated MPR for quasi-contiguous allocation for CA on Band 7. The PUCCH is overprovisioned on the lower component carrier, and the PUCCH size is 1 RB on both carriers.

It is estimated that for about 75 RB quasi-contiguous transmission, MPR requirement may be about 3 dB, and goes up to 6 dB for allocation sizes of 140+RBs. Using multi-cluster MPR mask, the MPR may be 11 and 8 dB, respectively. Although the case has not been simulated with other gap sizes, it is believed that using typical PUCCH sizes does not significantly alter the MPR requirements.

Many quasi-contiguous resource allocations have been simulated, with varying gap sizes and gap positions, for multiple channel bandwidths, and it is concluded that in most cases the resulting waveform conforms quite well to the contiguous allocation MPR. The reduction of excess MPR is significant.

Figure 10A:
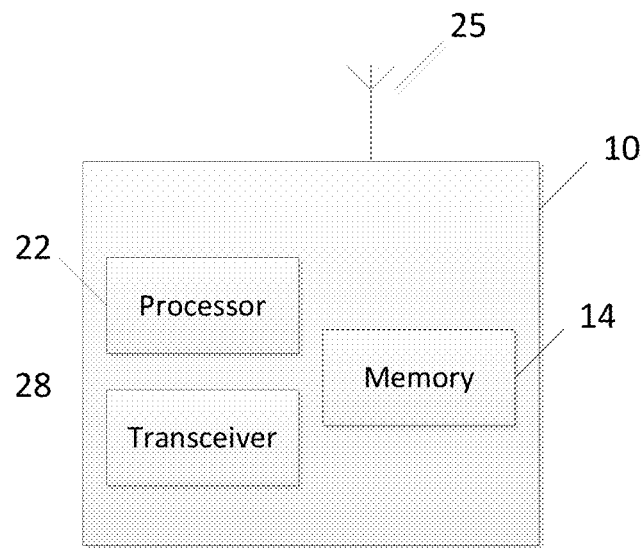
FIG. 10a illustrates an apparatus according to an embodiment.

FIG. 10a illustrates an example of an apparatus 10 according to an embodiment. In one example embodiment, apparatus 10 may be an eNB. It should be noted that one of ordinary skill in the art would understand that apparatus 10 may comprise components or features not shown in FIG. 10a.

As illustrated in FIG. 10a, apparatus 10 comprises a processor 22 for processing information and executing instructions or operations. Processor 22 may be any type of general or specific purpose processor. While a single processor 22 is shown in FIG. 10a, multiple processors may be utilized according to other embodiments. In fact, processor 22 may comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further comprises a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may comprise program instructions or computer program code that, when executed by processor 22, enable the apparatus 10 to perform tasks as described herein.

Apparatus 10 may also comprise one or more antennas 25 for transmitting and receiving signals and/or data to and from apparatus 10. Apparatus 10 may further comprise a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other example embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an example embodiment, memory 14 stores software modules that provide functionality when executed by processor 22. The modules may comprise, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one example embodiment, apparatus 10 may be an eNB. In certain embodiments, apparatus 10 may be configured to perform any of the first, second, and third embodiments outlined above or any combination thereof. For example, according to one embodiment, apparatus 10 may be controlled by memory 14 and processor 22 to allocate quasi-contiguous uplink data (e.g., PUSCH) resources for a user device where transmission of data comprise two or more data clusters of sub carriers expanding over gaps reserved for uplink control channel (e.g, PUCCH) in order to mitigate transmission power reductions due to multi-cluster transmission.

Figure 10B:
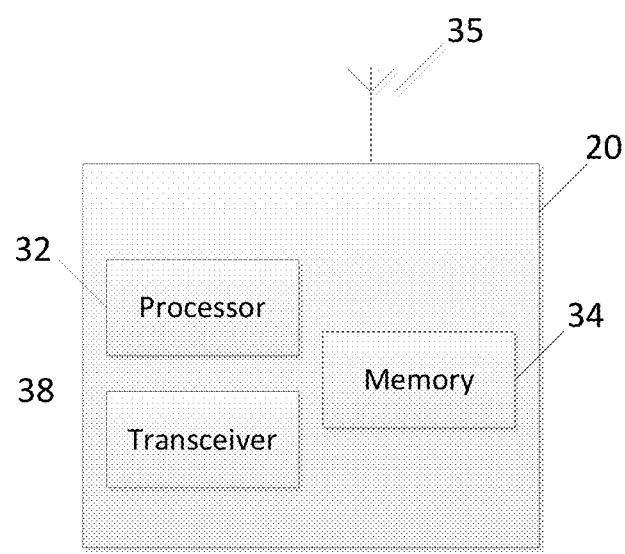
FIG. 10b illustrates an apparatus according to another embodiment.

FIG. 10b illustrates an example of an apparatus 20 according to another embodiment. In an embodiment, apparatus 20 may be a UE. It should be noted that one of ordinary skill in the art would understand that apparatus 20 may include components or features not shown in FIG. 10b.

As illustrated in FIG. 10b, apparatus 20 includes a processor 32 for processing information and executing instructions or operations. Processor 32 may be any type of general or specific purpose processor. While a single processor 32 is shown in FIG. 10b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a UE. In certain embodiments, apparatus 20 may be configured to perform any of the first, second, and third embodiments outlined above or any combination thereof. In this embodiment, apparatus 20 may be configured for quasi-contiguous transmission and may be controlled by memory 34 and processor 32 to transmit data comprising two or more data clusters of sub carriers expanding over gaps reserved for uplink control channel (e.g., PUCCH) in order to mitigate transmission power reductions due to multi-cluster transmission.

Embodiments of the invention can provide several advantages. For example, the proposed quasi-contiguous resource allocation can be used to reduce the excess MPR significantly. With current specifications, the eNB scheduler needs to use multi-cluster allocation for CA UEs, in order not to disturb PUCCH. The amount of MPR is relatively large, and the achievable throughput gain of CA is limited. With quasi-contiguous resource allocation as an exception case, the eNB scheduler would look for suitable resources, which then allow less MPR for the UE. This makes the CA configuration beneficial over a larger geographical area, with higher throughput gains.

For a UE, the proposed quasi-contiguous resource allocation is another step in the MPR calculation. Normally, the UE looks at the resource allocation, and determines whether it is contiguous or multi-cluster, and determines the MPR from the appropriate specification. With the quasi-contiguous addition, the MPR calculation has another step, e.g. a multi-cluster transmission uses the contiguous MPR definition.

In view of the above, one embodiment of the invention may be directed to a method for allocating quasi-contiguous uplink data resources for a user device where transmission of data comprise at least two data clusters of sub carriers expanding over gaps reserved for uplink control channel in order, for example, to mitigate transmission power reductions due to multi-cluster transmission.

Another embodiment may be directed to an apparatus configured to allocate quasi-contiguous uplink data resources for a user device where transmission of data comprise at least two data clusters of sub carriers expanding over gaps reserved for uplink control channel in order, for example, to mitigate transmission power reductions due to multi-cluster transmission.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method comprising:
   receiving an allocation of uplink data resources comprising clusters of sub carriers expanding over at least one gap of resource blocks for the user device from a base station;
   determining whether the allocation is quasi-contiguous;
   applying, in dependence of the determination of whether the allocation is determined to be quasi-contiguous, a maximum power reduction to a transmission in the allocated uplink data resources;
   wherein the determining whether the allocation is quasi-contiguous is based on at least one of:
   a determination that the at least one resource block gap in the allocation is filled with an uplink control channel allocation;
   a determination that a size of the at least one resource block gap in the allocation does not exceed a specified maximum; and
   a determination that the base station has signaled the allocation to be quasi-contiguous.

2. The method according to claim 1,
   wherein if the allocation is determined to be quasi-contiguous, the maximum power reduction applied is a maximum power reduction designated for contiguous allocations; and
   wherein if the allocation is determined not to be quasi-contiguous, the maximum power reduction applied is a maximum power reduction designated for multi-cluster allocations.

3. The method according to claim 1, wherein the uplink data resources comprise Physical Uplink Shared Channel resources.

4. The method according to claim 1,
wherein if the allocation is determined to be quasi-contiguous, the maximum power reduction applied is substantially in the range of 1-3dB; and
wherein if the allocation is determined not to be quasi-contiguous, the maximum power reduction applied is substantially within the range of 3-8.5dB.

5. The method according to claim 1, wherein the following parameters are used to determine where the uplink control channel allocation is located:
$N_{RB}^{(2)}$, where N indicates the amount of resource blocks (RBs) reserved for periodic channel quality indicator (CQI) reports;
$N_{CS}^{(1)}$, where N indicates the amount of cyclic shifts (CS) reserved for Physical Uplink Control Channel formats 1/1a/1b in the resource block (RB for mixed formats 2 and 1;
$N_{PUCCH}^{(1)}$, wherein N indicates the amount of persistently scheduled Physical Uplink Control Channel format 1a/1b resources; and
$\Delta_{shift}^{PUCCH}$, which indicates the cyclic shifts separating adjacent format 1/1a/1b resources.

6. The method according to claim 1, further comprising:
Storing a maximum gap size for each of a plurality of channel bandwidths and carrier aggregation bandwidths.

7. An apparatus, comprising:
at least one processor; and
at least one memory including computer program code,
wherein the at least one memory and the computer program code are configured, with the at least one processor, to cause the apparatus at least to:
receive an allocation of uplink data resources comprising clusters of sub carriers expanding over at least one gap of resource blocks from a base station;
determine whether the allocation is quasi-contiguous;
apply, in dependence of the determination of whether the allocation is determined to be quasi-contiguous, a maximum power reduction to a transmission in the allocated uplink data resources;
wherein the determining whether the allocation is quasi-contiguous is based on at least one of:
a determination that the at least one resource block gap in the allocation is filled with an uplink control channel allocation;
a determination that a size of the at least one resource block gap in the allocation does not exceed a specified maximum; and
a determination that the base station has signaled the allocation to be quasi-contiguous.

8. The apparatus according to claim 7,
wherein if the allocation is determined to be quasi-contiguous, the maximum power reduction applied is a maximum power reduction designated for contiguous allocations; and
wherein if the allocation is determined not to be quasi-contiguous, the maximum power reduction applied is a maximum power reduction designated for multi-cluster allocations.

9. The apparatus according to claim 7, wherein the uplink data resources comprise Physical Uplink Shared Channel resources.

10. The apparatus according to claim 7,
wherein if the allocation is determined to be quasi-contiguous, the maximum power reduction applied is substantially in the range of 1-3 dB; and
wherein if the allocation is determined not to be quasi-contiguous, the maximum power reduction applied is substantially within the range of 3-8.5dB.

11. The apparatus according to claim 7, the at least one memory and the computer program code are configured, with the at least one processor, to cause the apparatus at least to:
store a maximum gap size for each of a plurality of channel bandwidths and carrier aggregation bandwidths.

12. The Apparatus according to claim 7, wherein the following parameters are used to determine where the uplink control channel allocation is located:
$N_{RB}^{(2)}$, where N indicates the amount of resource blocks (RBs) reserved for periodic channel quality indicator (CQI) reports;
$N_{CS}^{(1)}$, where N indicates the amount of cyclic shifts (CS) reserved for Physical Uplink Control Channel formats 1/1a/1b in the resource block (RB for mixed formats 2 and 1;
$N_{PUCCH}^{(1)}$, wherein N indicates the amount of persistently scheduled Physical Uplink Control Channel format 1a/1b resources; and
$\Delta_{shift}^{PUCCH}$ which indicates the cyclic shifts separating adjacent format 1/1a/1b resources.

13. A computer program, embodied on a non-transitory computer readable medium, wherein the computer program is configured to control an apparatus to perform a process, comprising:
receiving an allocation of uplink data resources comprising clusters of sub carriers expanding over at least one gap of resource blocks from a base station;
determining whether the allocation is quasi-contiguous;
applying, in dependence of the determination of whether the allocation is determined to be quasi-contiguous, a maximum power reduction to a transmission in the allocated uplink data resources;
wherein the determining whether the allocation is quasi-contiguous is based on at least one of:
a determination that the at least one resource block gap in the allocation is filled with an uplink control channel allocation;
a determination that a size of the at least one resource block gap in the allocation does not exceed a specified maximum; and
a determination that the base station has signaled the allocation to be quasi-contiguous.

14. The computer program according to claim 13,
wherein if the allocation is determined to be quasi-contiguous, the maximum power reduction applied is a maximum power reduction designated for contiguous allocations; and
wherein if the allocation is determined not to be quasi-contiguous, the maximum power reduction applied is a maximum power reduction designated for multi-cluster allocations.

15. The computer program according to claim 13,
wherein if the allocation is determined to be quasi-contiguous, the maximum power reduction applied is substantially in the range of 1-3 dB; and
wherein if the allocation is determined not to be quasi-contiguous, the maximum power reduction applied is substantially within the range of 3-8.5dB.

16. The computer program according to claim 13, wherein the computer program is configured to control the apparatus to perform the process, further comprising:

storing a maximum gap size for each of a plurality of channel bandwidths and carrier aggregation bandwidths.

17. The computer program according to claim 13, wherein the uplink data resources comprise Physical Uplink Shared Channel resources.

18. The computer program according to claim 13, wherein the following parameters are used to determine where the uplink control channel allocation is located:
- $N_{RB}^{(2)}$, where N indicates the amount of resource blocks (RBs) reserved for periodic channel quality indicator (CQI) reports;
- $N_{CS}^{(1)}$, where N indicates the amount of cyclic shifts (CS) reserved for Physical Uplink Control Channel formats 1/1a/1b in the resource block (RB for mixed formats 2 and 1;
- $N_{PUCCH}^{(1)}$, wherein N indicates the amount of persistently scheduled Physical Uplink Control Channel format 1a/1b resources; and
- $\Delta_{shift}^{PUCCH}$, which indicates the cyclic shifts separating adjacent format 1/1a/1b resources.

* * * * *